March 4, 1952     G. M. BINER     2,587,959
NONJAMMING CONVEYER MEANS
Filed June 4, 1949
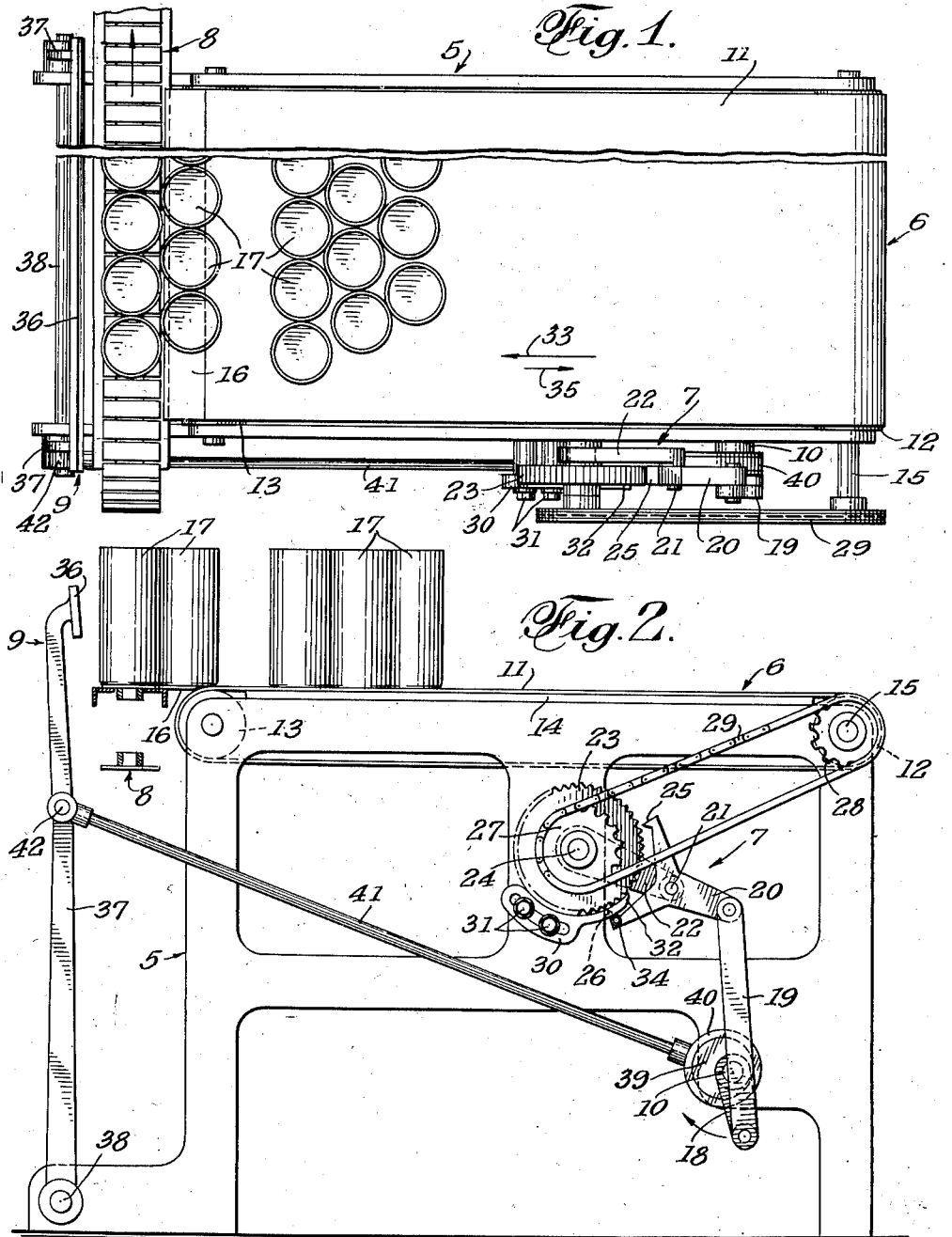
Inventor
GEORGE M. BINER
By C. G. Stratton
Attorney Patented Mar. 4, 1952

2,587,959

UNITED STATES PATENT OFFICE 2,587,959

NONJAMMING CONVEYER MEANS

George M. Biner, Los Angeles, Calif., assignor to Biner-Siegrist Machinery Manufacturing Co., Los Angeles, Calif., a corporation of California Application June 4, 1949, Serial No. 97,151

10 Claims. (Cl. 198—32)

This invention relates to a conveying mechanism for articles or containers such as bottles, jars and the like.

The primary object of the present invention is to provide novel, improved and efficient means for transferring articles such as bottles from a relatively wide belt on which articles may be dumped by the case, to a single file conveyor that moves transverse to the movement of said wide belt.

Another object of the invention is to provide means, as above indicated, that keeps articles, such as containers or bottles, from jamming at the discharge end of the conveyor on which they are dumped so that the same may be conveyed away in single file for successive handling in filling devices, labeling devices, etc.

Broadly, therefore, the invention contemplates unscrambling mechanism that automatically unscrambles haphazardly arranged articles and conveys them in orderly single file, thereby greatly facilitating the work of feeding, filling, labeling and other machines that handle such articles successively.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

Fig. 1 is a top plan view, partly broken away, of conveying means according to the present invention.

Fig. 2 is a side elevational view thereof.

That embodiment of the present invention which is illustrated comprises, generally, a suitable support frame 5, a preferably wide endless conveyor belt 6 supported by said frame, means 7 to alternately advance and retract said belt whereby the advancing movement is greater than the retracting movement, a single file conveyor 8 that receives articles from belt 6, and a rail 9 operatively connected to the means 7 for moving the same synchronously with the belt 6 to align articles on conveyor 8 in such a manner that they are free to move with said conveyor without interference with adjacent articles.

The frame 5 may be variously constructed. Essentially the same affords supports for belt 6, means 7, conveyor 8 and rail 9. Although not shown, said frame may also support a prime mover such as an electric motor for continuously driving shaft 10 of means 7. Conveyor 8 may be driven from the same motor or separately.

The belt conveyor 6 comprises an endless belt 11 that is mounted on rolls 12 and 13, and support plate 14 for the upper run of said belt. The roll 12 is provided with an extended shaft 15 which is driven by the means 7. At the opposite end of said belt there is provided a fixed apron 16 onto which articles 17 are slid by the belt as the same advances toward conveyor 8.

The means 7 comprises a crankarm 18 on continuously driven shaft 10, a link 19 connected between the end of said arm and a pawl arm 20 that is carried on a pivot 21 on the free end of an oscillating arm 22, and a ratchet wheel 23 fixed on a shaft 24. Arm 22 is mounted to oscillate on shaft 24.

Pawl arm 20 has a Y-shaped form in which the diverging branches terminate in dogs 25 and 26 for alternate engagement with the teeth of ratchet wheel 23. A drive is provided between shafts 24 and 15 and is here shown as sprockets 27 and 28 on said respective shafts, and a chain 29 trained therearound.

The means 7 further includes a throwout cam 30 which is slotted for adjustability on studs 31 and which is provided with a tapered shoe 32 adjacent the periphery of ratchet wheel 23 and in the path of movement of dog 26.

With crankarm rotating clockwise, from the low position thereof that is shown, link 19 will be moved upward to tilt pawl arm 20 upward on its pivot 21 and bring dog 25 into driving engagement with ratchet wheel 23. Since there is no longer any relative movement between arms 20 and 22, they will move together in a counter-clockwise direction during continued clockwise rotation of crankarm 18. Consequently, the belt 11 will be advanced in the direction of arrow 33 toward the left until said crankarm 18 has reached its highest position opposite to the low starting position shown on the drawing. Thus, the belt 11 is advanced a distance commensurate to the full angular movement of arm 22.

As crankarm 18 moves downward from its high position, pawl arm 20 will first rock down on its pivot to withdraw dog 25 and engage dog 26 with the ratchet wheel. The ratchet wheel will then be rotated in a clockwise direction until a roller 34 on said dog rides over shoe 32 to effect disengagement of said dog and ratchet wheel. Crankarm 18 will continue toward its low position but the drive to belt 11 will be interrupted. Thus, said belt will be retracted in the direction of arrow 35 a distance commensurate to the angular travel of dog 26 before the same encounters shoe 32—a distance which is shorter than the distance of advance travel of said belt.

The two relative distances of advance and retractive movement of belt 11 may be proportioned as desired by adjustment of throwout cam 30 around the periphery of the ratchet wheel to give a two-to-one ratio, a three-to-two ratio, etc.

The single file conveyor 8 is generally conventional and is positioned transversely at the discharge end of belt 11 to receive articles conveyed by said belt. The upper run of said conveyor is level with apron 16 so that articles may readily slide from the latter onto the former.

The rail 9 comprises an elongated bar 36 arranged at the rear of conveyor 8, said bar being mounted on arms 37 pivoted on frame 5 at 38. Said rail is movable in synchrony with and counter to the movement of belt 11—toward the belt when the latter is advanced and away from the belt when the latter is retracted. Said rail movement is effected through the medium of an eccentric 39 on driven shaft 10, a strap 40 around said eccentric, and a pitman rod 41 extending from said strap and pivotally connected at an intermediate point 42 of one arm 37.

Before belt 11 is advanced, rail bar 36 is rearward of conveyor 8 and as the belt advances, said bar moves toward the conveyor to arrest articles to substantially center them on said conveyor. Thus, there will be articles on the conveyor, on apron 16, and on belt 11 adjacent said apron. Consequently, the articles on the conveyor will be so confined by the mass of adjacent articles that they will be unable to move with conveyor 8 which will merely slide by.

As the movement of belt 11 is reversed, the articles on the same will be retracted therewith, as shown in the drawing. Simultaneously, rail bar 36 will move rearwardly away from the articles on conveyor 8, thereby freeing one side of said latter articles. Now, the conveyor 8 is effective to transport the articles thereon, since the mass of articles on belt 11 has been retracted leaving only those on apron 16. The latter articles, needing only slight displacement, are readily by-passed by the articles on the conveyor which are thus freed to be transported by the conveyor.

While the apron 16 is shown wide enough to support articles, the same may be narrow to insure engagement of the articles thereon with belt 11. Thus, upon retraction of said belt, all of the articles, except those on conveyor 8, will be retracted, obviating the need for the slight displacement above mentioned.

The advance and retractive movement of belt 11 may be so timed with relation to the speed of movement of conveyor 8 that the row of articles on the latter is conveyed away before the next row of articles is moved onto said conveyor. Under conditions where the conveyor 8 is stopped or is completely loaded while belt 11 continues to operate, the articles would merely be shuttled across the conveyor and the apron until those on the former are transported away, when the normal operation will be reinstituted.

While the invention that has been illustrated and described is now regarded as the preferred embodiment, the construction is, of course, subject to modifications without departing from the spirit and scope of the invention. It is therefore not desired to restrict the invention to the particular form of construction illustrated and described, but to cover all modifications that may fall within the scope of the appended claims.

Having thus described the invention, what is claimed and desired to be secured by Letters Patent is:

1. Conveying means comprising an endless belt adapted to receive articles in haphazard fashion, means for advancing said belt a pre-determined distance and alternately retracting the same a lesser distance to intermittently move articles thereon toward the discharge end of said belt, a continuously moving single-file conveyor arranged transverse to said belt and receiving said articles, an article-stopping rail parallel to said conveyor, and means connecting said rail and the belt-advancing and -retracting means to move said rail counter to the movement of the belt.

2. Conveying means comprising an endless belt adapted to receive articles in haphazard fashion, means for advancing said belt a pre-determined distance and alternately retracting the same a lesser distance to intermittently move articles thereon toward the discharge end of said belt, a fixed apron to receive articles from the belt, a continuously moving single-file conveyor parallel to said apron and adapted to receive articles displaced from said apron by articles on the belt, an article-stopping rail parallel to said conveyor, and means connecting said rail and the belt-advancing and retracting means to move said rail counter to the movement of the belt, said rail arresting movement of articles displaced from said apron by articles advanced by the belt to align them on the single-file conveyor.

3. Conveying means comprising an endless belt adapted to receive articles in haphazard fashion, means for advancing said belt a pre-determined distance and alternately retracting the same a lesser distance to intermittently move articles thereon toward the discharge end of said belt, a continuously moving single-file conveyor arranged transverse to said belt and receiving said articles, a member above and parallel to said conveyor, and means for moving said member counter to the movement of the belt between a position over the conveyor when the belt is advanced, and a position clear of the conveyor when the belt is retracted, said member arresting the movement of articles advanced by said belt to align them on the single-file conveyor.

4. Mechanism for driving an endless belt comprising a continuously rotating crankarm, a ratchet wheel, means connecting the latter to drive the belt, oscillating pawl means connected to said crank arm and having spaced dogs to alternately engage and drive the ratchet wheel during one revolution of the crankarm to rotate said ratchet wheel and move the belt first in one direction and then in the other, and a shoe adjacent the periphery of the ratchet wheel and in the path of movement of one of said dogs to move the latter out of driving engagement with the ratchet wheel for a portion of the revolution of said crankarm.

5. Mechanism for driving an endless belt comprising a continuously rotating crank arm, a ratchet wheel, means connecting the latter to drive the belt, oscillating pawl means connected to said crankarm and having spaced dogs to alternately engage and drive the ratchet wheel during one revolution of the crankarm to rotate said ratchet wheel and move the belt first in one direction and then in the other, and an adjustable throwout member having a tapered shoe adjacent the periphery of the ratchet wheel and in the path of movement of one of said dogs to retract the latter from driving engagement with the ratchet wheel to, thereby, arrest the motion of the latter and of the belt during a porion of the revolution of said crank arm.

6. Mechanism for driving an endless belt comprising a continuously rotating crankarm, a ratchet wheel, means connecting the latter to drive the belt, oscillating pawl means connected to said crankarm and having spaced dogs to alternately engage and drive the ratchet wheel during one revolution of the crankarm to rotate said ratchet wheel and move the belt first in one direction and then in the other, said pawl means comprising an arm mounted for free rotation on the axis of the sprocket wheel and a dog-carrying arm pivotally mounted on the free end of the latter arm, whereby said dog-carrying arm is tiltable relative to the mentioned latter arm, and an adjustable throwout member having a tapered shoe adjacent the periphery of the ratchet wheel and in the path of movement of one of said dogs to retract the latter from driving engagement with the ratchet wheel to, thereby, arrest the motion of the latter and of the belt during a portion of the revolution of said crankarm.

7. In combination with an endless belt and a transverse moving conveyor at one end of said belt, a continuously rotating crankarm, a ratchet wheel, means connecting the latter to drive the belt, oscillating pawl means connected to said crankarm and having spaced dogs to alternately engage and drive the ratchet wheel during one revolution of the crankarm to rotate said ratchet wheel and move the belt first in one direction and then in the other, a shoe adjacent the periphery of the ratchet wheel and in the path of movement of one of said dogs to move the latter wheel for a portion of the revolution of said crankarm, a member parallel to and associated with the conveyor, and means driven together with the crankarm and connected to said member to move the latter counter to the movement of the belt.

8. In combination with an endless belt and a transverse moving conveyor at one end of said belt, a continuously rotating crankarm, a ratchet wheel, means connecting the latter to drive the belt, oscillating pawl means connected to said crankarm and having spaced dogs to alternately engage and drive the ratchet wheel during one revolution of the crankarm to rotate said ratchet wheel and move the belt first in one direction and then in the other, a shoe adjacent the periphery of the ratchet wheel and in the path of movement of one of said dogs to move the latter out of driving engagement with the ratchet wheel for a portion of the revolution of said crankarm, a member parallel to and associated with the conveyor, and means driven together with the crankarm and connected to said member to move the latter counter to the movement of the belt, said latter means comprising an eccentric-operated pitman.

9. In combination, an endless belt, a member beyond one end of said belt to arrest articles discharged from said belt end, a moving conveyor interposed between said belt end and said member and receiving said articles, means for advancing said belt a pre-determined distance and alternately retracting the same a lesser distance to intermittently move articles thereon toward the conveyor, and means to move said member toward the belt when the latter is advancing and away from the belt when the same is retracting.

10. In combination, an endless belt, a member beyond one end of said belt to arrest articles discharged from said belt end, a moving conveyor interposed between said belt end and said member and receiving said articles, means for advancing said belt a pre-determined distance and alternately retracting the same a lesser distance to intermittently move articles thereon toward the conveyor, means to move said member toward the belt when the latter is advancing and away from the belt when the same is retracting, and a common drive for the latter two means.

GEORGE M. BINER.

REFERENCES CITED

The following references are of record in the file of this patent:

UNITED STATES PATENTS

| Number | Name | Date |
|---|---|---|
| Re. 20,675 | Todd | Mar. 22, 1938 |
| 1,524,291 | Dennis | Jan. 27, 1925 |
| 1,729,237 | Albertoli | Sept. 24, 1929 |
| 2,071,859 | Steiner | Feb. 23, 1937 |
| 2,301,543 | Hlavaty | Nov. 10, 1942 |
| 2,462,021 | Harker | Feb. 15, 1949 |